May 1, 1951 E. C. SWENSON 2,551,351
BOX AND BOAT AUTOMOBILE CARRIER
Filed June 6, 1947 3 Sheets-Sheet 1
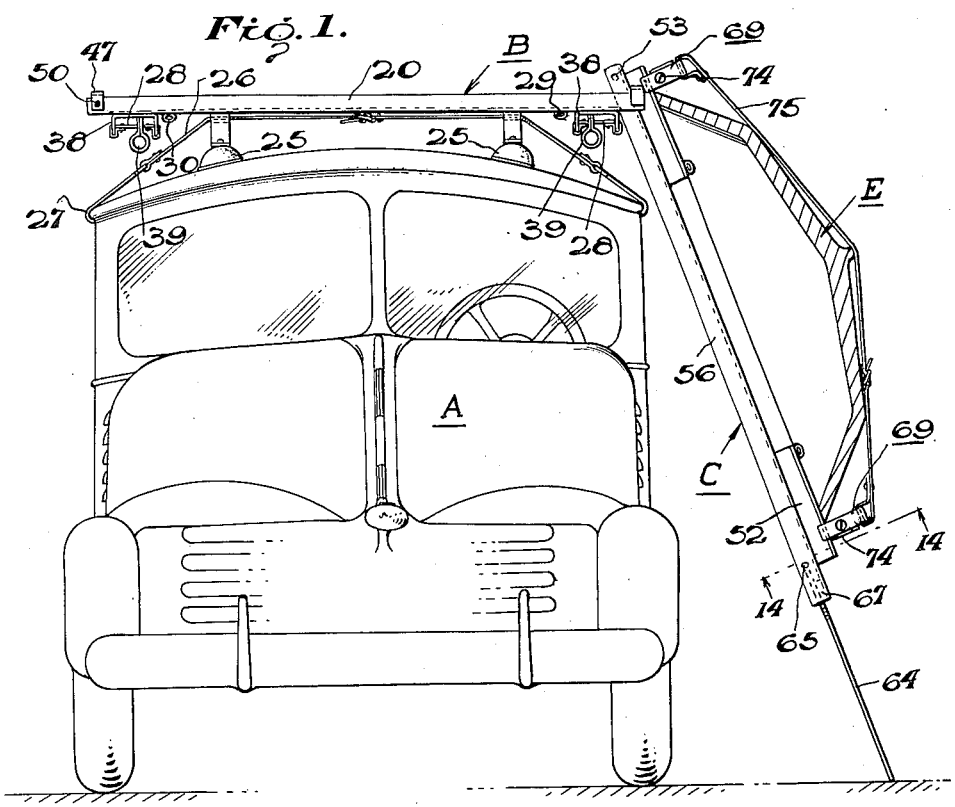
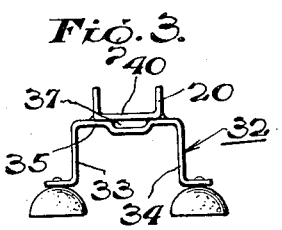
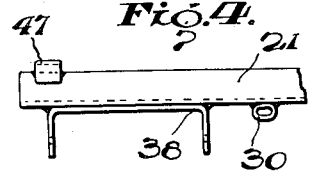
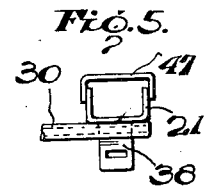
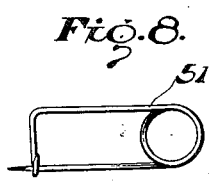
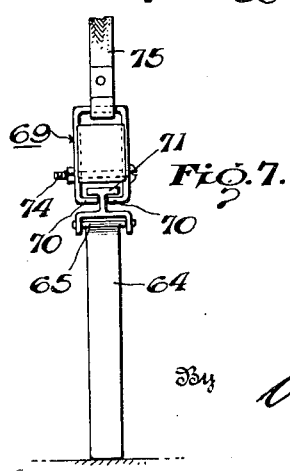
Inventor
Elvin C. Swenson.
By Wilfred E. Lawson
Attorney

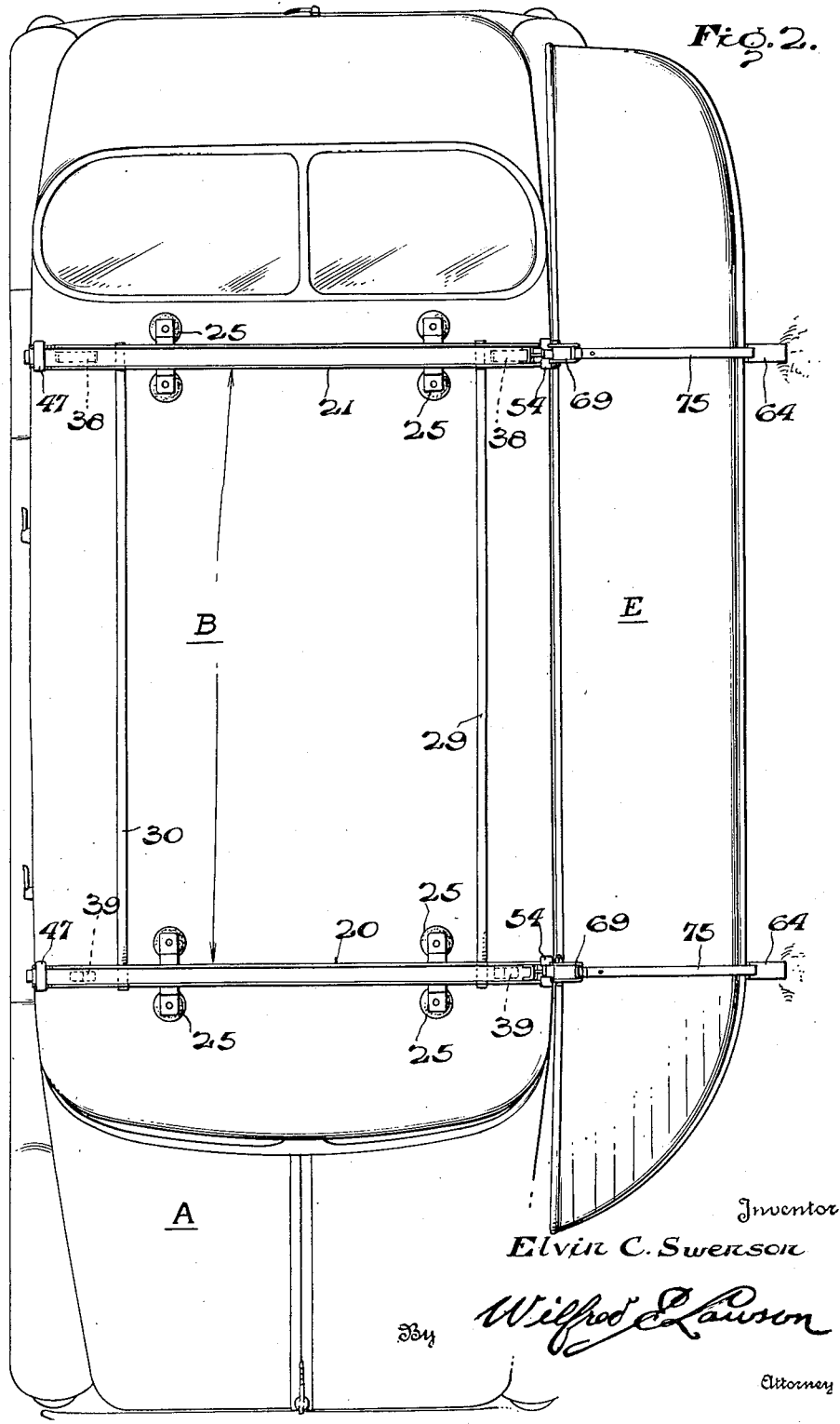

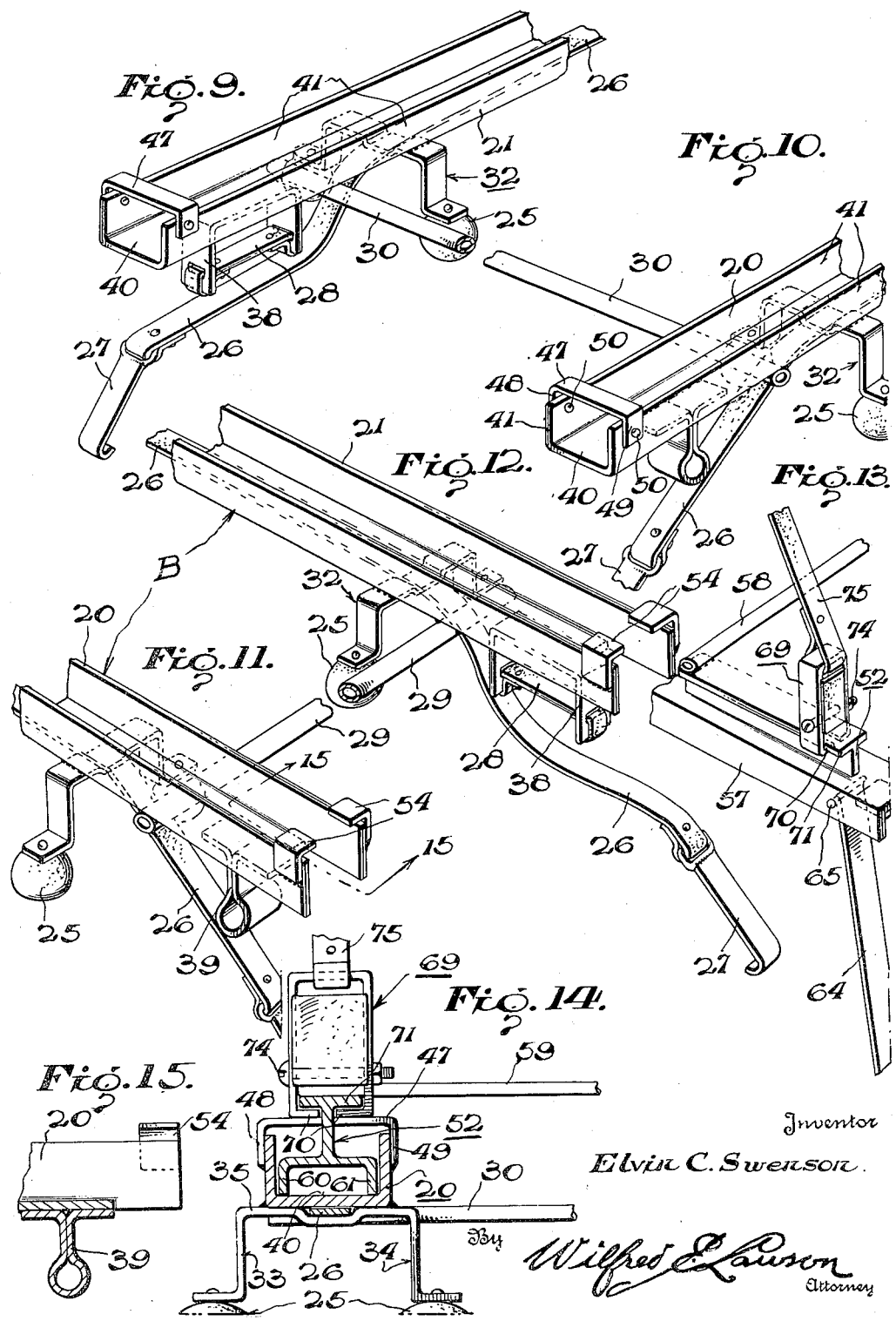

Patented May 1, 1951

2,551,351

UNITED STATES PATENT OFFICE 2,551,351

BOX AND BOAT AUTOMOBILE CARRIER

Elvin C. Swenson, Watertown, S. Dak., assignor, by decree of distribution, to Rose Swenson, Watertown, S. Dak.

Application June 6, 1947, Serial No. 752,903

4 Claims. (Cl. 214—77)

The present invention relates to an article carrier for passenger vehicles, trailers or the like, and particularly to carriers of the type adapted to be mounted on the roof or top of the vehicle.

Heretofore carrier racks for passenger vehicles or the like have provided no means, whereby the articles to be carried can be hoisted onto the roof supported carrier rack. Accordingly, unless the article is small or light in weight, it is impossible to load the same onto the article carrier rack. Generally the articles to be carried on the vehicle top carrier rack are large and bulky and it is a major problem to provide some practical arrangement for loading or unloading these large articles to and from the top of the vehicle.

The principal object of this invention is to provide in combination with a vehicle top carrier rack, novel means for loading and unloading heavy, large and bulky articles onto and from the carrier rods in the top of the vehicle.

Another object is to provide a loading and unloading apparatus associated with a vehicle top carrier rack, which can be handled and operated with ease by one individual to load and unload heavy and bulky articles which would be impossible to handle without some form of loading apparatus.

Another object is to provide a loading and unloading apparatus, which when not in use is confined completely within the frame of the vehicle carrier rack, so as to appear to be a part thereof.

Broadly the present invention comprises an article carrier rack with a pair of spaced substantially parallel channel members or the like joined together and secured to the top of a passenger vehicle, said channel members being secured and fixed transverse the vehicle top and each slidably mounting a movable load carrier comprising relatively smaller channel members or the like, each of which are adapted to be pulled outward from the rack and sloped downwardly from the ends of the rack channel members, until their opposite ends are resting on the ground at the side of the vehicle to form a load supporting ramp for loading or unloading purposes.

The above and other objects and advantages of the invention will appear more fully hereinafter from a consideration of the detailed description which follows taken together with the accompanying drawings wherein one embodiment is illustrated.

In the drawings wherein like reference characters refer to like parts throughout the several views, Figure 1 is a front view of a passenger vehicle with the carrier rack attached and the loading and unloading members slanting down from the ends of the rack to the ground at the side of the vehicle with a boat supported thereon, for example.

Figure 2 is a top plan view of the vehicle and carrier rack with the loading and unloading members and boat thereon in the position as shown in Figure 1.

Figure 3 is a transverse cross section view of one of the carrier channel members.

Figure 4 is a side elevational view of an end portion of one of the rack channel members.

Figure 5 is an end elevational view of the end of one of the rack channel members showing a portion of one of the connecting brace bars and the U-strap under which slides the end of one of the loading and unloading bar members.

Figure 6 is an end elevational view of the opposite end of the rack channel members to the end shown in Figure 5.

Figure 7 is an end elevational view of one of the loading and unloading bar members, showing a novel strap mounting arrangement and lug adapted to provide for holding and strapping on an article to be loaded, such as the boat illustrated, for example.

Figure 8 is a detailed view of one of the safety clips for holding the load carrier members within the rack members in retracted position.

Figures 9 and 10 are partial perspective views of the rear ends of the rack channel members showing the mounting straps, hooks and suction-cup brackets, and one connecting brace bar.

Figures 11 and 12 are views similar to Figures 9 and 10 of the front or receiving ends of the rack channel members.

Figure 13 is a partial perspective of one of the loading and unloading members, illustrating the ground engaging end and extensible leg section, with its lower connecting brace bar also partially shown.

Figure 14 is a transverse cross section view illustrating one side of the carrier rack with one of the loading and unloading members in retracted position.

Figure 15 is a longitudinal section view taken along line 15—15 to show the end of the bottom web of one of the rack channels and also to show one form of rack used for carrying fish poles, oars or other objects.

Referring in detail to the drawings, there is shown for example, a passenger motor vehicle A with a sedan style body and on the top of the vehicle is mounted the novel combination carrier rack and loading and unloading apparatus of the present invention which comprises a fixed rack B and a movable load carrier C.

The fixed part comprises the fixed carrier rack B including supporting members, such as channel members 20 and 21, which members are securely fixed transverse the top of the vehicle A by rubber suction cups 25 and straps 26 connected at each end with hooks 27. The supporting members 20 and 21 are rigidly connected together by spaced connecting bars or braces 29 and 30 flattened at each end and welded to the under side of the supporting members, see Figures 2 and 4 for example.

The rubber suction cups 25 are riveted to the legs of brackets 32. These brackets are formed like an inverted U with legs 33 and 34 and a cross bridge 35. The bridge is secured to the bottom of the channel members 20 and 21 by soldering or welding, see Figure 3. Also, the bridge 35 is counter-sunk to form an opening 37 between the bottom of each of the members 20 and 21 to receive the securing straps 26. These straps 26 extend from end to end of the members 20 and 21, and hooks 27 engage over the rain rail of the vehicle. The member 21 is provided with a slotted U-bracket 38 at each end to hold separate straps 28. These straps 28 cooperate to support the paddle end or an oar or the large end of a fish pole, while the member 20 is provided with a looped member generally numbered 39 to receive the other end of the pole or oar.

Each supporting member 20 and 21 has a bottom web 40 and side walls 41. Also, each end of each one of the members is slightly different. For example, the load carrier bars 45 and 46 can only slide in and out from one end of the members, hereinafter called the front end, as the opposite end of the members hereinafter called the rear end has a stop member 47 mounted across it against which a mounting 52 on the load carrier bar abuts, see Fig. 14. This stop member 47 is formed from a U-shaped metal strap with each leg 48 and 49 inverted over the side wall of each fixed carrier member 20 or 21. Openings 50 are formed through the inverted legs 48 and 49 and the side walls 41 of the fixed carrier members, which openings are adapted to line-up with similar openings 53 formed in an end of the load carrier bars for reception of a safety clip 51, see Figures 1 and 8, to hold the apparatus together when not used for loading or unloading.

The front end of each of the fixed supporting members 20 and 21 is provided with a guide member 54, which is similar to the stop member 47 at the rear end of the members, except it is formed with a slot 55 in the top to permit passage of the mountings 52 or load supporting T blocks, hereinafter described in connection with the movable load carrier C.

Resting on the fixed part B when in carrying position is the movable part C. The movable part comprises main channel members 56 and 57 and cross braces 58 and 59. The main members 56 and 57 resemble channel irons with side flanges 60 and 61 turned down, which flange ends serve as runners to slide in and out on the bottom web 40 of main members 20 and 21 of the stationary part B. When the movable part is moved to the loading position from the load carrying position on the vehicle top, it is pulled out horizontally and lowered downward. When in the loading position the lower end of the movable part is supported by legs 64 mounted on a pivot pin 65 mounted between the flanges 60 and 61. These legs are pivoted on the pin 65 and are prevented from going past the correct position by blocks 67. When the movable part is being moved to the carrying position the legs are folded up and under the main supporting members 56 and 57 and occupy a space between the fixed part B and the movable part C when the apparatus is in carrying position.

Attached to the main members 56 and 57 of the movable part B are the load carrier blocks 52 which are in the form of a T section with the cross of the T at the top and the stem of the T attached to the main members 56 and 57 at the bottom of the T. To hold a boat E or other load in position, there are four clamps 69 having flexible jaws 70 which engage under the T-head 71 of each carrier block 52. These clamps are held in position by tightening the jaws by means of bolts 74. Each of these clamps may be moved in or out along the blocks 52 to fit the load. In the loading position the clamps on the upper end of the movable part also act as a safety check and will not permit the movable part C to come out from and fall away from the fixed part B, except when the movable part C is raised to the horizontal position. Straps 75 secured to the clamps 69 are provided for holding the boat E or other load in position on the movable part.

*Operation*

The operation of the apparatus is generally apparent from the foregoing description, however, a brief summary of the operation may be helpful in clearing up any possible ambiguities. As illustrated in the drawing a boat E is secured to the movable load carrier C after the safety clip 51 has been removed from the end openings 50 and 53 formed in the ends of the fixed carrier members and the movable load carrier members, respectively.

When this clip has been removed the operator pulls the movable load carrier forward along the fixed carrier members and tilts the same downwardly from the side of the vehicle top. In this position the load carrier is retained partly by the guide 54 and by the ground legs 64, which are turned on their pivot pins into ground engaging position. With this accomplished the load carrier may serve as a ramp to permit the boat E, for example, to be slid upward thereon onto the T-blocks 52, whereupon the clamps 69 are bolted into the T heads 71 on each side of the boat.

Promptly after securing the clamps 69, the straps 75 are secured tightly around the body of the boat, which is thus secured to the load carrier C. The next step is for the operator to reach down and grip each leg 64 and pull up and forward as though handling a wheelbarrow. With this upward and forward hoisting operation the load carrier C is raised toward a horizontal plane and its main members 56 and 57 are moved forward along the bottom webs 40 of each fixed rack carrier member 20 and 21 under guide 54, until the end of T-block 52 is stopped by striking against the inner side of the stop 47, as shown in Fig. 14. When this is done the fixed and movable parts are secured against horizontal displacement by safety clips 51, which pass through the aligned holes 50 and 53 of the respective parts.

Thus the boat E is loaded on the vertical top and ready for transportation. Oars, fish poles or the like may be inserted in the brackets 39 carried by one of the fixed carrier members, if desired.

The unloading of the boat is obviously the reverse of the loading operation after removal of the safety clips and so on.

Thus I have provided an article carrier with a novel loading and unloading arrangement with respect to vehicle tops or the like, which can be handled and operated with ease by one individual from a side of the vehicle to load or unload heavy and bulky articles, which would normally require two or three men to handle.

While only one embodiment of the apparatus has been illustrated and described, other changes and modifications which will not appear to those skilled in the art may be made without departing from the scope of the present invention. To determine the scope of the invention reference should be had to the appended claims.

What is claimed as new is:

1. A vehicle top mounted carrier rack comprising a fixed assembly and a movable load carrier assembled, said load carrier assembly being slidably mounted in the fixed assembly and adapted to serve as a ramp from the ground to the top of the vehicle for loading and unloading purposes, said fixed assembly comprising a pair of rigidly connected spaced apart channel members, and said movable assembly comprising a pair of rigidly connected spaced apart channel members inverted with respect to said fixed channel members, said movable assembly channel members being relatively smaller than the fixed assembly members so as to slide within the same to loading and unloading positions with respect to the vehicle top.

2. In combination with a carrier rack for vehicle tops, a loading and unloading apparatus comprising a pair of substantially parallel spaced elongated members, brace means connecting said members together, load supporting blocks at each end and upon the top of each member, clamp members adjustably mounted on said blocks to accommodate different sizes of articles to be carried, and straps connected to each of the clamp members for securing the article on the loading and unloading apparatus.

3. A loading and unloading apparatus for use in relation to the top of a vehicle comprising in combination with a luggage carrier fixed to the top of the vehicle, a load carrier connected to said luggage carrier at the side of the vehicle, means for guiding said load carrier onto said luggage carrier, stop means for limiting the position of the load carrier on the luggage carrier, and a safety clip adapted to interlock the said carriers together on top of the vehicle.

4. A loading and unloading apparatus for use in relation to the top of a vehicle comprising in combination with a luggage carrier fixed to the top of the vehicle, a load carrier connected to said luggage carrier at the side of the vehicle, means for guiding said load carrier onto said luggage carrier, stop means for limiting the position of the load carrier on the luggage carrier, a safety clip adapted to interlock the said carriers together on top of the vehicle, and rack members secured to the underside of said luggage carrier for fish poles, oars or the like.

ELVIN C. SWENSON.

REFERENCES CITED

The following references are of record in the file of this patent:

UNITED STATES PATENTS

| Number | Name | Date |
| --- | --- | --- |
| 420,605 | McCauley | Feb. 4, 1890 |
| 1,681,936 | Hillstrom | Aug. 28, 1928 |
| 2,180,032 | Casley | Nov. 14, 1939 |
| 2,247,128 | Levey | June 24, 1941 |
| 2,392,008 | Squires | Jan. 1, 1946 |
| 2,395,173 | Dobler | Feb. 19, 1946 |
| 2,412,162 | Lindblom | Dec. 3, 1946 |
| 2,434,826 | Wubben | Jan. 20, 1948 |
| 2,446,092 | Lait | July 27, 1948 |